US007735457B2

(12) United States Patent
O'Connor

(10) Patent No.: US 7,735,457 B2
(45) Date of Patent: Jun. 15, 2010

(54) WATER ESCAPE APPARATUS FOR ANIMALS

(75) Inventor: April M. O'Connor, Long Beach, CA (US)

(73) Assignee: April Marie O'Connor, Long Beach, CA (US)

( * ) Notice: Subject to any disclaimer, the term of this patent is extended or adjusted under 35 U.S.C. 154(b) by 720 days.

(21) Appl. No.: 11/623,052

(22) Filed: Jan. 12, 2007

(65) Prior Publication Data

US 2008/0169153 A1 Jul. 17, 2008

(51) Int. Cl.
*B65G 69/30* (2006.01)

(52) U.S. Cl. ...................................... 119/849; 119/753

(58) Field of Classification Search .................. 182/93, 182/97; 119/847–849, 843, 705, 753; *B65G 69/00, B65G 11/00, 11/12, 69/30*
See application file for complete search history.

(56) References Cited

U.S. PATENT DOCUMENTS 3,891,053 A * 6/1975 Burton ........................ 182/97
4,541,507 A * 9/1985 Gibellato ..................... 182/86
4,724,925 A * 2/1988 Ritten ......................... 182/97
5,242,029 A * 9/1993 Marcella ...................... 182/82
6,000,494 A * 12/1999 Wilson ........................ 182/93
6,003,633 A * 12/1999 Rolson ....................... 182/127
6,058,875 A * 5/2000 Krish, Jr. .................... 114/362
6,463,613 B1 * 10/2002 Thompson .................. 14/69.5
6,715,177 B1 * 4/2004 Lagergren-Julander ..... 14/69.5
6,725,487 B2 * 4/2004 Myrick et al. ................ 14/69.5
6,983,823 B1 * 1/2006 Zumbrunnen ................ 182/49
7,011,036 B1 * 3/2006 Hill ............................ 114/362
7,011,045 B1 * 3/2006 Zehner ....................... 119/673
7,523,516 B1 * 4/2009 Waddell et al. .............. 14/69.5
2003/0106743 A1 * 6/2003 St-Pierre et al. ............... 182/93

* cited by examiner

*Primary Examiner*—Son T Nguyen
*Assistant Examiner*—Marisa Conlon

(57) ABSTRACT

The invention relates to an apparatus for helping an animal, primarily a four-legged animal (such as a pet dog or cat), also possibly a human child, escape from a body of water onto a water-adjacent elevated surface. The apparatus is deployed facing the water at an edge of the elevated surface. The apparatus comprises a deck anchor component, fillable with liquid for weight, and, preferably, a friction means to reduce slipping on the elevated surface. The apparatus also comprises a stair component hingedly connected to the anchor component for rotation between lowered, raised, and folded positions. The stair component comprises at least one stair step to be submerged while the stair component is in the lowered position with the anchor component resting on the elevated surface. The animal can escape to the elevated surface by placing its feet (preferably, rear paws) on the step and thrusting upwardly. And, preferably, while drained and in the folded position, the apparatus is light and compact enough for it to be carried, preferably by a built-in handle, and stored.

2 Claims, 5 Drawing Sheets

WATER ESCAPE APPARATUS FOR ANIMALS

CROSS-REFERENCE TO RELATED APPLICATIONS

None

BACKGROUND OF THE INVENTION

The present invention relates to a water escape apparatus, and more particularly to an apparatus that helps a four-legged pet animal (such as a dog or cat) climb from a body of water (such as a swimming pool) onto a water-adjacent surface above the water level (such as a pool deck). And, although the invention is directed primarily for use by four-legged animals, it is recognized that embodiments of the invention may also be utilized by humans (particularly small children).

It has long been thought desirable to provide an apparatus at the periphery of a swimming pool or other body of water for an animal to escape from the water to the adjacent pool deck or other platform. This is particularly so where the escape requires overcoming a vertical or steep rise to a pool deck or other safe platform such as a boat deck, dock, or top of a reservoir or channel wall. Among the previously proposed apparatuses that might help pets escape from a body of water are the following (it being understood that these summaries do not reflect all of the disclosed elements, features or limitations of, and are not intended as a substitute for the actual documents being referenced).

Previous ideas for enabling an animal to climb out of a body of water onto an adjacent elevated surface included the notion of providing a ramp and/or steps. See, for example, the following U.S. patents.

U.S. Pat. No. 6,598,562 issued to Dutkiewicz et al. on Jul. 29, 2003 discloses a ramp extending at an angle from the side of a swimming pool into the water, the lower end of the ramp being hinged to a submerged platform that is attached to an existing pool ladder. But, it does not appear to disclose an apparatus that can be easily carried by hand, or one having a refillable container (also referred to herein as a refillable deck anchor part), stair steps, an upper hinge, or a carrying handle.

U.S. Pat. No. 6,941,889 issued to McCrocklin et al. on Sep. 13, 2005 discloses a ramp, the upper end removably attached to an existing boat ladder and the lower end held away from the boat ladder at an angle to extend into the water, the ramp forming a frame for a set of preferably concave stair steps. But, it does not appear to disclose an apparatus that is easily carryable by hand, or one having a refillable deck anchor part, stair steps with varied depths (depth of a step being the distance from its front to its back), or a carrying handle.

U.S. Pat. No. 7,011,036 issued to Hill on Mar. 14, 2006 discloses a ramp hingedly connected at its upper end to the deck of a boat (or dock or any other object adjacent a body of water) so the ramp can be swung into a lowered position where the lower end is held away from the side of the boat at an angle to extend into the water, and the ramp can be swung into a raised position to remove it from the water, and the traction surface of the ramp can comprise a mesh, grate, slip resistant material, and/or plurality of steps. But, it does not appear to disclose an apparatus that is easily carryable by hand, or one having a refillable deck anchor part or stair steps with varied depths.

U.S. Pat. No. 6,796,864 issued to Schoos on Sep. 28, 2004 discloses a floating—part being slightly submerged—flexible netting extending into a swimming pool, with the netting's upper end attached to a refillable flexible tube located near the edge of the swimming pool deck, the tube being fillable with water from a hose through a valve having a replaceable cap, and, when the tube is empty, the device is foldable. But, this patent does not appear to disclose an apparatus for use by large animals, or one having steps, a hinge, or a carrying handle.

U.S. Pat. No. 7,017,709 issued to Laymance on Mar. 28, 2006 discloses a non-vertical marine safety ladder for use by dogs or other animals as well as humans, comprising an upper pivot (to pivot between floating and submerged positions), a stop component for limiting the downward rotation of the ladder) to an angle resembling a flight of stairs (such as 45 degrees relative to the water surface), and stair steps that are horizontal when the ladder is submerged and rotated to the stop position. However, this patent does not appear to disclose an apparatus that is easily carryable by hand, or one having a refillable deck anchor part, varying the step depth, or a carrying handle.

U.S. Pat. No. D506,583 (a design patent) issued to Salonen on Jun. 21, 2005 discloses a pet pool ladder comprising a single perforated step that appears to be connected to two vertical frames, which frames appear to have short substantially horizontally disposed pieces at the top and bottom presumably to provide a connection (or abutment) to, and horizontal separation from, the side of a pool, and the step appearing to be vertically adjustable on the frames. But, it does not appear to disclose an apparatus that is easily carryable by hand, or one having a refillable deck anchor part, multiple steps (or varying their depth), an upper hinge, or a carrying handle.

U.S. Pat. No. 6,321,689 issued to Fulmer on Nov. 27, 2001 discloses a sheet of weighted (or negative buoyancy) netting hanging substantially vertically over the edge of a pool deck from a collapsible framework, the framework being removably secured to the pool deck (e.g., by hooks), wherein the netting can be rolled up and the framework collapsed. But, it does not appear to disclose an apparatus having a refillable deck anchor part, steps, an upper hinge, or a carrying handle.

U.S. Pat. No. 6,643,879 issued to Davis on Nov. 11, 2003 (which appears to be a patent for the pet pool escape ramp product marketed as SKAMPER-RAMP®) discloses a ramp device comprising a buoyant center member and two buoyant wing members (each member with a convexly curved outer edge), a "movable attachment" (such as, but not limited to, flexible straps) removably securing the top of the center member to a pool deck, wherein the center member can rotate from a generally horizontal floating position to a downwardly sloping semi-submerged position when a swimming animal, such as a dog or cat, climbs onto the ramp. The lower rear corners of the downwardly turned wing members contact the wall to prevent rotation beyond the desired ramp incline angle. The ramp surface can be corrugated or have grooves, ridges or non-skid coating. The device can be flipped up out of the water onto the pool deck and replaced in the pool as desired. And, the device can be collapsed by folding-in the wing members. However, this patent does not appear to disclose an apparatus having a refillable deck anchor part, steps, upper hinge that does not require it being secured to an adjacent structure or the ground, or a carrying handle.

U.S. Pat. No. 5,862,541 issued to Mailhot on Jan. 26, 1999 discloses an exit ramp primarily, though not necessarily exclusively, directed to helping very small animals escape from a pool skimmer environment. The ramp (described as an elongated platform comprising an inclined upper surface along which the trapped animals may climb) is attached to a post or other support structure via a pivot (hinge) located at an intermediate section of the ramp, and the ramp has a "traction means" (such as transverse grooves, a rough surface, or small holes). However, this patent does not appear to disclose an apparatus for use by large animals, or one having a refillable deck anchor part, steps, an upper hinge to rotate the ramp out of the way or to collapse it for carrying or storage, or a carrying handle.

There also are devices that provide means for persons to move between docks and boats that utilize ramps and/or steps but which do not involve escape (particularly escape by animals) from the water. An example of this is found in U.S. Pat. No. 6,813,792 issued to Miller on Nov. 9, 2004, which discloses a gangway ramp and ladder combination, a pivotal connection between the ramp and ladder, and steps on the ladder with the lower step being pivotable between an up and down position. When in a down position, the depth (distance from front to back) of the lower step is shown as being greater than the depth of the upper step. However, this patent, and presumably others relating to pedestrian movement between boat and dock, does not appear to indicate that any of its design features, or elements, are particularly suited, or adaptable, for facilitating a four-legged animal's escape from the water. And, this patent does not appear to disclose an apparatus that is easily carryable by hand, or one having a refillable deck anchor part, upper hinge that would permit raising the steps (or ramp) vertically out of the way, or a carrying handle.

Thus, it appears that none of the foregoing patents describe or suggest an apparatus that provides a combination of features that would do all of the following: enable four-legged animals to escape a body of water onto an adjacent elevated platform by climbing steps; enable the apparatus to be held in its deployed configuration at the edge of the platform without securing it to any other object; enable the apparatus to remain in place even when it is being used by a large animal; enable the apparatus to be compact in its deployed configuration; enable the apparatus to be pivotable out of the way of persons using the body of water; and, enable the apparatus to be easily folded and hand-carried.

It is believed that the present invention, which is described more fully below, provides advantages not afforded by the relevant prior art.

SUMMARY OF INVENTION

As used throughout this specification, unless the context indicates otherwise, the following terms have the definitions referred to or specified in this paragraph. Terms of direction (such as "up," "down," "left," and "right"), relative time (such as "when" and "concurrent"), relative position (such as "aligned," "adjacent," "proximate," and "within"), orientation (such as "vertical" and "horizontal"), and shape (such as "circular" and "elliptical") are not intended to be limited to the exact direction, relative time, relative position, orientation, or shape referred to but are intended to be inclusive of approximations and substantial similarities to those directions, relative times, relative positions, orientations, and shapes. The term "described or shown" is intended to include "described and shown." The term "such as" is intended to suggest an example, without limitation to only that example. Reference to a thing being "within" something else is intended as a reference to the thing being at least partly within the something else. Reference to a thing occurring "while" something else occurs is not intended as a requirement that the thing be occurring for the entire time the something else occurs. The term "herein" is intended to include the drawings as well as the other sections of this specification (including the claims). The terms "include," "includes," and "including" are not intended to be limited to only the number or type of items expressly enumerated in connection with the use of those terms.

The present invention relates to an apparatus for use by an animal, primarily a four-legged animal (such as a pet dog or cat), as an aid to help the animal escape on its own from a body of water (such as a swimming pool) onto a water-adjacent (proximate to the water) elevated (having an elevation above the water level) surface. (Examples of water-adjacent elevated surfaces include an above water surface of a structure—such as a pool deck, dock, or platform, a boat, or even a natural or man-made feature of the land, that are proximate to the border of, are floating on, or are supported above a body of water.) (References herein to "the water" are intended as references to the body of water; and, references hereinafter to a "deck" are intended as short-hand references to a water-adjacent elevated surface—which, of course, may be a pool deck, as in the embodiments described below with reference to the drawing figures, but is not limited to that form of a water-adjacent elevated surface. References herein to the edge of the deck, the deck edge, or the deck's edge are references to an edge of the deck that faces toward the body of water. And, coping at the edge of the deck is considered to be part of the deck. It being typical for coping to line the edge of a pool deck, the deck edge of a pool would typically be the edge of the coping facing toward the water.) The apparatus is adapted to be deployed (configured and located for use by an animal to escape the body of water) at an edge of the deck, with the front of the apparatus facing toward the water. Of course, it is recognized that any such apparatus, where appropriately sized, also may be usable by a human-particularly a child.

The apparatus comprises a deck anchor component. Said anchor component comprises a container for holding liquid (preferably water), the container being enclosed, except for one or more container openings (preferably ones that are resealable) for inserting and removing the liquid. (The deck anchor component is also referred to herein as a refillable deck anchor part.) And, preferably, the anchor component comprises a friction means for increasing (relative to the anchor component not having the friction means) the resistance of the anchor component to sliding on the deck. (The friction means forms at least part of the bottom surface of the anchor component and has characteristics that increase the static friction between the anchor component's bottom and the deck's upper surface, which characteristics can be provided by, for example: grooves, bumps, dimples, indentations, peaks and valleys, suction cups, surface conforming material such as soft plastic or rubber, and any other non-skid material, and any combination of some or all of these things. The friction means can be made of, attached to, or simply placed in contact with the bottom of the anchor component to form the at least part of the bottom surface.) The apparatus also comprises a stair component. The stair component comprises one or more stair steps connected to a stair support structure, which preferably is made of a plastic and/or composite material but also may be made of any other conventional structural material such as metal (including tubes and/or pipes), wood, and/or any of the other materials mentioned below. The connection(s) can be made using any conventional connection means, which includes such things as: continuity of material (making the steps and stair support structure from the same continuous piece of material by, for example, molding or otherwise shaping the material to form both parts), welds, bolts, nails, adhesives, and notches, and any combination of some or all of these things. Preferably, the friction means provides sufficient resistance, when the container is filed with the fluid, to prevent the anchor component from sliding relative to the upper surface of the deck while the stair component is deployed and used, for example, by a dog weighing up to a maximum design weight limit for the apparatus, such as 50-70 pounds, to climb from the water (at a level from which the dog can reach at least one step) onto the deck. It is believed that a dog of such size could easily be accommodated by an apparatus embodying the invention, where the anchor component comprises a container with a capacity to hold less than 12 gallons of water.

The apparatus comprises a hinge that rotatably connects the stair component to the anchor component. (As used herein, "hinge" refers to any conventional hinge means, which includes such things as: at least one cylindrical piece (such as a rod or rod-like protrusion) that extends laterally from the stair component into the anchor component—or from the anchor component into the stair component; a flexible strip of material (optionally even the same material from which the connected components are made); and/or any assembly of at least one hinge part and a rod (such as an assembly with a hinge part having at least one opening—which is not limited to a hole, but includes any form of opening having at least one side open such as an indentation, a recess, or a groove—through or into which the rod passes, and with at least one of the hinge parts connected to the stair component or to the anchor component.) And, the stair component and anchor component are rotatable relative to one another between positions that comprise a lowered position, a raised position, and a folded position.

While the apparatus is deployed for use and the stair component is in the lowered position, the stair component hangs downwardly on the water side of the deck edge, preferably the hinge is proximate the edge, and the anchor component rests on the deck. The stair component is adapted in size and shape for the upper surface of at least one step to be below a predetermined water level relative to the deck, when the stair component is in the lowered position. (In some embodiments of the invention, the stair support structure can be vertically slideably adjustable. This could be accomplished by, for example, having one or more vertical portions of the structure comprise adjacent parts that are vertically slideable relative to one another, with any conventional means for releasably holding them in a selected relative position, such as by use of removable pins, pegs or bolts through aligned holes or by use of opposing sawtooth or grooved parts. Thereby, enabling the user to adjust and set the level of at least one step relative to the level of the deck (thus relative to the level of the water). The animal is able to escape the water by placing its feet (preferably, the rear paws of a four-legged animal) on the submerged upper surface and thrusting its body up to the next step (if there is more than one step) and eventually onto the deck. Preferably, where there is more than one step, the steps are sized and arranged for the horizontal depth of each step to be greater than the horizontal depth of the next higher step. As used herein, "horizontal depth" means the step's maximum front-to-back dimension, not how far it is submerged. The front-to-back dimension is the horizontal distance perpendicular to the axis of the hinge, measured, assuming the apparatus is deployed as described above with the stair component in the lowered position, from the most forward usable part of the step to the most rearward usable part of the step. The usable part is the part made for an animal, of the type and size for which the particular apparatus is designed, to step onto with at least one foot (or, perhaps more correctly, paw). Also, references herein relating to the orientation of any part of the apparatus (such as references to the bottom, top, upper, lower, vertical, or horizontal aspect of the part) are, unless the context clearly indicates otherwise, intended as references relating to the orientation of that part as if the apparatus were deployed for use, with the stair component in a lowered position and the anchor component resting on the deck, even if the reference is being made to the part while it is in some other orientation.

While in the raised position, the stair component is out of the water and the anchor component continues to rest on the deck. Preferably, the stair component can be rotated to a raised position at which it does not obstruct swimming or other activity in the water next to the apparatus.

The stair component and anchor component are rotatable into the folded position by rotating the stair component in a rearward direction (relative to where it is while in the deployed position) and/or rotating the anchor component in a downward direction (relative to where it was when resting on the deck) until the stair component and anchor component reach the folded position (a position wherein the stair and anchor components are sufficiently close to one another to satisfy a predetermined specification for the folded position—preferably making the apparatus compact enough for one person to carry it). Preferably, when the apparatus is rotated into the folded position, at least part of the anchor component enters into at least some of the volume defined by the outer overall dimensions of the stair component.

And, the apparatus preferably comprises a handle that is built in or attached to the apparatus whereby the apparatus can be gripped for carrying by one hand while the stair component and anchor component are in the folded position.

Preferably, the apparatus is made of sufficiently light weight materials (or, material if only one is used) for the total weight of the apparatus, with the container drained of fluid, not to exceed a weight that can be easily lifted by an average adult female person using the handle. (It is believed possible to make an apparatus embodying the invention with a total empty weight for the apparatus of less than 10-15 pounds using conventional materials and manufacturing techniques.) Preferably, the stair component and the anchor component each have structures made of molded plastic material with a finished thickness throughout most of the structure not exceeding approximately one-eighth of an inch, with the material used for making the underwater portions of the stair component being non-buoyant in the aggregate. Alternatively, any other conventional material(s) that provide sufficient strength, rigidity, durability, and resistance to corrosion and other damaging chemical effects, for the apparatus to operate in the environment and the manner described herein, can be used. Such alternative materials include: fiberglass, aluminum, stainless steel, carbon fiber, wood, rubber (natural or synthetic), composite material, and any combination of some or all of them. The apparatus also preferably comprises pads for preventing undue rubbing against the deck, the sidewall of any container of the body of water, or both the deck and the sidewall. And, preferably, the apparatus has edge support means (such as having a portion of the stair component or the anchor component include—whether permanently attached or removable—one or more edge support pads and/or having the stair component or the anchor component, or both of them, shaped to substantially conform to the deck proximate to the deck edge) for providing support to the apparatus at or near the deck edge (sometimes referred to as the lip of the deck).

The present invention relates to all embodiments of such an apparatus.

BRIEF DESCRIPTION OF THE DRAWINGS

The present invention will be more clearly understood by reference to this specification in view of the accompanying drawings, in which.

DETAILED DESCRIPTION OF PREFERRED EMBODIMENTS

Figure 1:
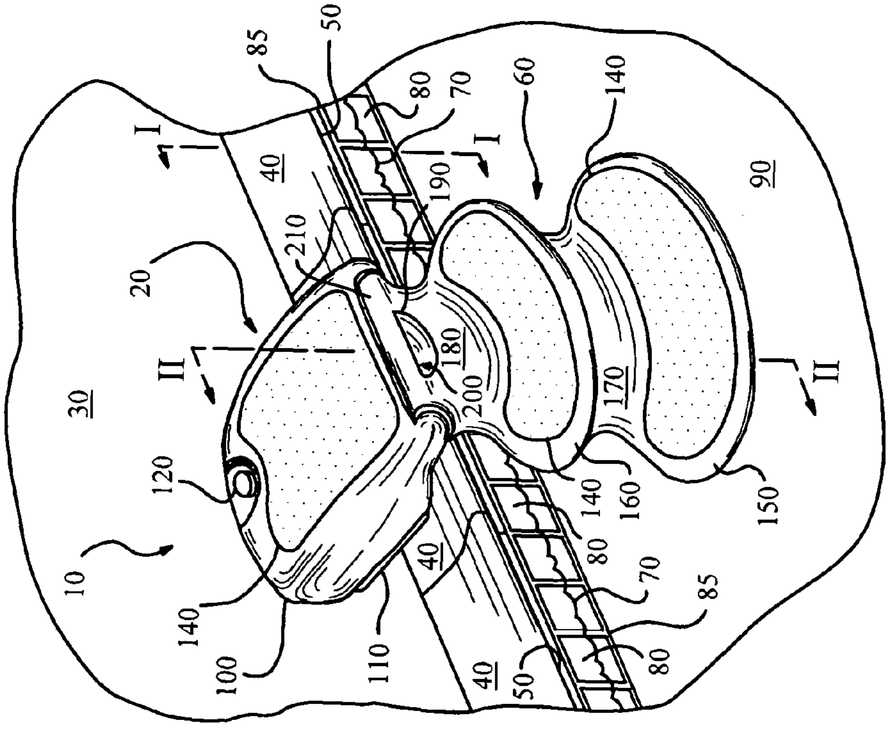
FIG. 1 is a perspective view of an embodiment of the invention, deployed in an in-use environment at the edge of a swimming pool deck (with the stair component in a lowered position relative to the at-rest—on the deck—anchor component), as seen from an upper right front position relative to the apparatus.

Referring to the drawings, FIG. 1 shows a preferred embodiment of the invention apparatus 10 installed with a deck anchor component 20 resting on a swimming pool deck 30 (the deck is shown here as including coping 40 leading to the deck edge 50) and with a stair component 60 deployed (lowered) into a body of water 70 within the swimming pool. The level of the water is shown at approximately the middle of the vertical tiles 80 which are seen as lining the top of the pool wall 90 and are shown surrounded by tile seating material 85 (any material conventionally used for grouting and preferably securing tile in place in a swimming pool).

FIG. 1 also shows the anchor component 20 having a fluid container 100 and a friction means 110. The friction means 110 should be made of material that is effective for providing a sturdy and durable base for supporting the rest of the anchor component 20 and for increasing the static friction between the anchor component 20 and the deck 30. In FIG. 1, the friction means 110 is shown as a layer of anchor component 20 base material (although it could alternatively be a plurality of pieces of the same material or a mixture of materials). Preferably, the base material is fixedly attached to the bottom of the anchor component 20. As another alternative, the friction means 110 could be composed in whole or part of the same material as the anchor component. In FIG. 1, the friction means 110 is in contact with and resting upon the deck 30 (which in this embodiment includes coping 40). Preferably, the friction means 110 is made using one or more conventional friction-inducing materials and/or one or more friction-inducing surface configurations, and has a size and shape, that will generate enough static friction between the anchor component 20 and the deck 30, at least while the friction means 110 is pressed against the deck 30 by the weight of the container 100 filled with a liquid such as water, to prevent lateral movement of the anchor component 20 during normal use, e.g., to prevent such movement due to waves in the water and animals using the apparatus to escape the water under conditions in which the particular apparatus was designed to be used. (It is expected that those skilled in the art could, in view of the disclosures herein, readily anticipate, and design an embodiment of the invention to accommodate, a range of environmental conditions—such as wave conditions, and a range of manners of use—such as the ways in which the designed-for animals will attempt to use it. Normal use is further discussed below.) Potential conventional friction-inducing materials include such materials as rubber, soft plastic, and gum-like materials. Potential friction-inducing surface configurations include such configurations as roughness, grooves, protrusions, pits, and suction cups. Of course, alternatively, the friction means 110 could be made as an integral part of the container 100 bottom and, as such, may not necessarily be visually distinct from it.

Figure 2:
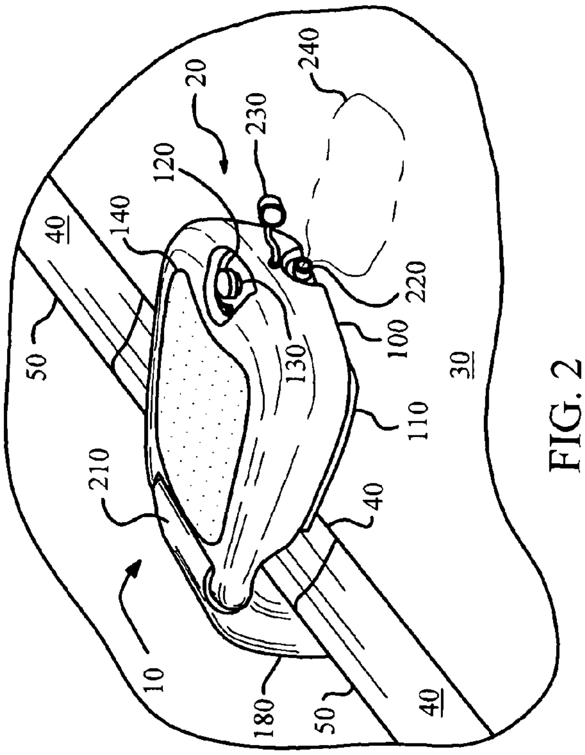
FIG. 2 is a perspective view of an embodiment similar to the one shown in FIG. 1, but with an alternative (more rounded) profile for the portion where the stair component is connected to the anchor component, as seen from an upper left rear position relative to the apparatus.
Figure 4:
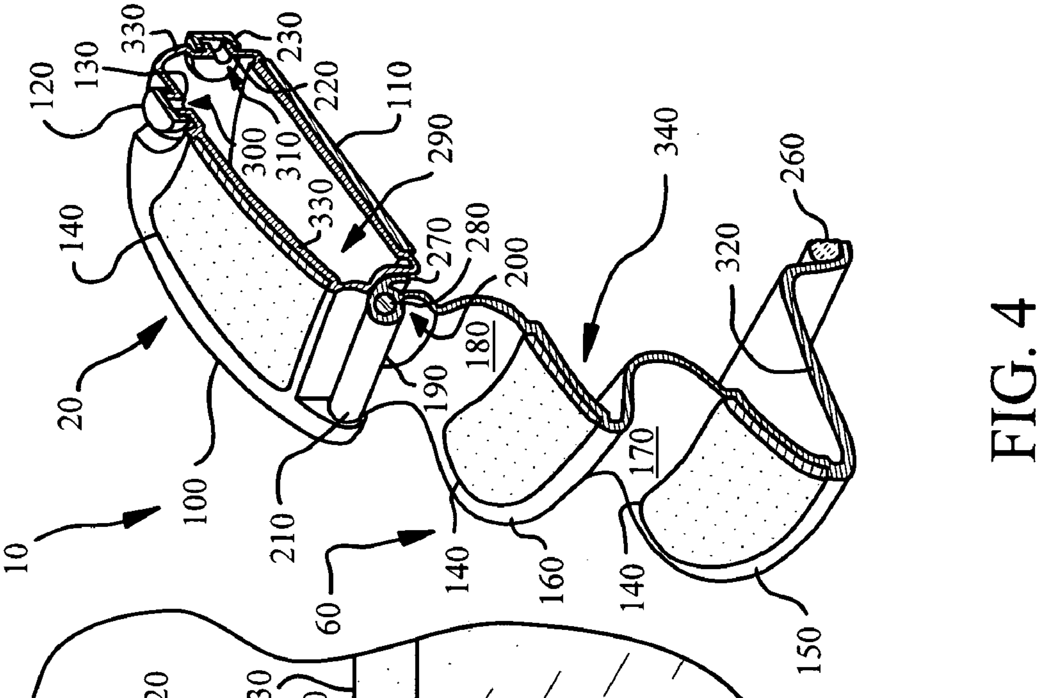
FIG. 4 is a perspective view of an embodiment similar to the one shown in FIG. 1, but with a third alternative (more cylindrical) profile shape for the nose portion (the top front of the stair component) and with the apparatus separated from the in-use environment, as seen through cross-sectional cut II-II (the cut being through the center of the apparatus).

In the embodiment shown in FIG. 1, the anchor component 20 is seen to also have a fill-stem cap 120 for removably covering (preferably being threadable on and off) a fill stem 130, which provides access to a fill opening 300 for liquid to be inserted into the container 100. (The fill stem 130 and fill opening 300 are not visible in this figure, but the fill stem 130 is shown in FIGS. 2 and 4, and the fill opening 300 is shown in FIG. 4.)

And, the embodiment shown in FIG. 1 has a traction surface 140 on the upper surface of the container 100. The traction surface 140 can be located on, attached to, embedded in, or incorporated into, or otherwise made part of the upper surface of the container 100. The traction surface 140 can be made of any material and/or have any upper surface configuration that provides traction for the paws of an animal such as a dog or cat that is attempting to climb onto the traction surface. Examples of potential materials and configurations for the traction surface 140 include those listed herein for the friction means 110.

Additionally, in the embodiment shown in FIG. 1, the stair component 60 has a lower step 150, an upper step 160, a step connecting structure 170, and a stair component upper structure 180. FIGS. 1, 3-5, 7 and 8, show a traction surface 140 on the upper surfaces of the lower step 150 and the upper step 160. (The material and configuration used for any traction surface 140, which may be located on any part of the apparatus where traction is deemed potentially helpful to an escaping animal—e.g., on any of the steps 150,160 or the container 100, need not be the same as the material and/or configuration used for the traction surface 140 on any other part of the apparatus.)

FIG. 1 shows the upper structure 180 having a carrying handle 190 access to which is provided via a concave grip opening 200. The grip opening 200 is sized and configured to accommodate insertion therein of one or more (preferably more) adult human fingers (preferably those of the largest typical size for a male), for lifting upwardly on the stair component 60. In FIG. 1, the upper structure 180 is shown with a nose portion 210. The handle 190 is shown in FIG. 1 located just below the crown of the nose portion 210. The nose portion 210 can have any profile shape that accommodates the placement of the handle 190 for carrying the apparatus 10 (discussed above and below), the hinged connection between the stair component 60 and the anchor component 20 (discussed below), and the rotation of the stair component 60 relative to the anchor component 20 (discussed below). Examples of alternative profile shapes for the nose portion 210 are shown in FIGS. 2-4.

Additional features of an embodiment of the invention apparatus 10 can be seen in FIG. 2. FIG. 2 shows the nose portion 210 having a significantly more rounded profile shape than the one shown in FIG. 1. This alternative profile shape for the nose portion 210 may be preferred if the apparatus 10 is to be used, for example, where the radius of the curvature of the deck's edge 50 is large or where it is necessary or advantageous to increase the horizontal separation between the front of the anchor component 20 and the downwardly disposed portion of the stair component's upper structure 180 (which, then, determines the position from which the lower parts of the stair component 60 are suspended). FIG. 2 also shows the fill stem 130, although most of it is covered by the fill-stem cap 120; and shows a drain stem 220, which provides access to a drain opening 310, for liquid to exit the container 100. (The drain opening 310 is not visible in this figure but is shown in FIG. 4.) Also shown in FIG. 2, is a removable drain-stem cap 230 (preferably threadable on and off the drain stem 220), which is seen in this figure as being removed from the drain stem 220 thereby allowing the fluid to flow out of the container 100. (The exiting fluid is shown here as forming a puddle 240 on the deck 30.)

Figure 3:
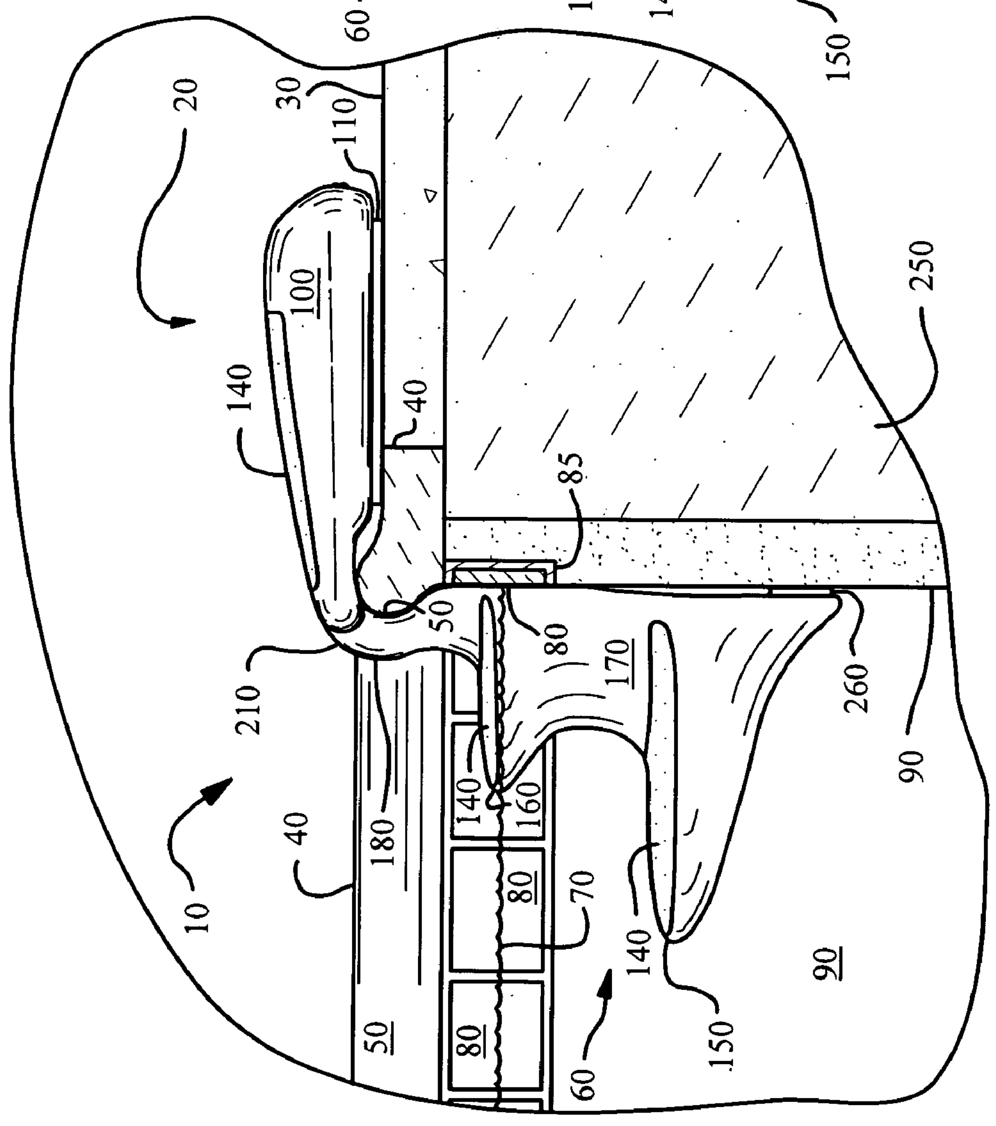
FIG. 3 is a left side view of the embodiment shown in FIG. 2, as seen through cross-sectional cut I-I (the cut being through the supporting pool structure adjacent the left side of the apparatus but not through the apparatus).

FIG. 3 shows how an embodiment, substantially similar to the apparatus 10 shown in FIG. 1 (but with a more rounded profile shape, similar to that shown in FIG. 2, for its nose portion 210). As shown in FIG. 3, the apparatus is viewed from the left side (through cross-sectional cut I-I shown in FIG. 1), and is located at a swimming pool deck edge 50. Like the deck 30 shown in FIG. 1, the deck 30 shown in FIG. 3 comprises coping 40 in the vicinity of the deck edge 50. (Cross-sectional cut I-I reveals a depiction of the in-use environment, comprising the deck 30 together with its coping 40, the pool wall 90, the vertical tiles 80, the tile seating material 85, and the earth material 250 underlying the deck 30.)

As can be seen in the embodiment shown in FIG. 3, the anchor component 20 comprises the container 100 and is supported primarily by the friction means 110 which presses downwardly, under the weight of the container 100 (which weight is of course variable depending on the amount of fluid in the container 100), against the deck 30. Preferably, as shown in FIG. 3, the stair component 60 comprises at least one bumper pad 260 disposed on the bottom rear portion of the stair component 60 for minimizing the effects of impact with the pool wall 90. Of course, in embodiments having a bumper pad 260, the bumper pad 260 should protrude rearwardly enough to reduce the potential for and/or effects of impact and rubbing between the stair component 60 and the wall 90 while the apparatus 10 is deployed and in normal use. (Normal use being use in an environment where the apparatus is acted upon by the forces of water and escaping animals that are within the ranges of forces the apparatus is designed to accommodate. Normal use is further discussed above.). Preferably, the bumper pad 260 is made, at least in part, of a material that is capable of being incorporated into the stair component 60 (such as by being attached using mechanical fasteners or adhesion, or even being formed from material used in making another part of the stair component 60), that is flexible (such as rubber or a resilient plastic), and that, at least for the rearward surface of the bumper pad 260, will not cause any, or at least minimize, damage to the wall 90 while the stair component 60 is deployed and in normal use.

Preferably, as shown in FIG. 3, a front portion of the anchor component 20, which front portion may be part of the container 100 (or, alternatively, may be part of the stair component's upper structure 180) receives support at a point proximate to (as used herein, "proximate to" is intended to include "at") the deck edge 50. In FIG. 3, such support is shown as being provided by the lip portion of the coping 40. However, in alternative embodiments, such support can be provided by a deck 30 surface having another configuration (e.g., a flat deck with a squared-off edge 50, with or without a coping 40) wherein an alternatively shaped lower surface of the front portion of the anchor component 20 (or, alternatively, of the upper structure 120) is made to rest upon the alternative configuration of the surface of the deck 30. (Such support also may be provided, or supplemented, by including a separate support piece—not shown—which could, for example, be secured to a part of the apparatus 10 or the deck 30 or be separable and insertable into place when needed.)

FIG. 4 shows additional features in an embodiment substantially similar to the embodiment shown in FIGS. 1-3 except for the nose 210 having a different alternative profile shape (in this case more cylindrical) and having an optional, preferably flexible, rear flange 270, which can, though need not necessarily be, included to for example contact the anchor component 20 and provide some resistance against rapid rotation of the stair component 60 relative to the anchor component 20. However, where a flange 270 is included, it and/or the portion of the anchor component 20 against which it presses should be shaped and sufficiently flexible to avoid preventing rotation of the stair component 60 and/or anchor component 20 into the folded position (discussed further in the Summary section and below).

As seen through cross-sectional cut II-II, FIG. 4 also shows a hinge rod 280 passing through the nose portion 210, the axis of the rod 280 being aligned with the longitudinal (left-right) dimension of the nose portion 210. Although not shown, each end of the hinge rod 280 shown in FIG. 4 extends beyond the nose portion 210 into a preferably cylindrical recess in each of the respective adjacent parts of the anchor component 20 to form a hinged connection between the upper structure 180 (thus the stair component 60) and the anchor component 20. Of course, any other conventional means for hingedly connecting the stair component 60 with the anchor component 20 can be used (discussed further in the Summary section). The view through cross-sectional cut II-II shown in FIG. 4 also reveals an enclosed (except for a fill opening 300 and drain opening 310) container cavity 290 into which liquid can be inserted through the fill opening 300 (shown here with a fill stem 130 that is covered by a fill-stem cap 120) and out of which the liquid can be drained through the drain opening 310 (shown here with a drain stem 220 that is covered by a drain-stem cap 230). And, FIG. 4 also shows cross-sectional cut II-II passing through a bumper pad 260 that is attached to and centrally located along the bottom rear of the stair component 60. And, FIG. 4, through cross-sectional cut II-II, shows the stair component 60 having a stair component shell structure 320 defining an open faced (in this embodiment) shell-component rear cavity 340, and the anchor component 20 having an anchor component shell structure 330 defining the container cavity 290. As used herein, "shell structure" means a layer of structural material, which may be a composite material, having a maximum thickness that is thin (for example, less than $1/10^{th}$) relative to the layer's maximum non-thickness dimensions (such as overall length and overall width—both of which are, of course, measured as a circumference where the surface is closed), and comprising at least one concave or convex shape. A shell structure is preferred since a shell structure is believed to provide greater strength with less weight than is provided by other conventional structures. It is also believed that a shell structure suitable for an embodiment of the invention can be made using inexpensively manufactured materials, such as plastic that is molded or otherwise conventionally formed into the desired shape. Nevertheless, alternative embodiments of the invention may utilize any other conventional structural material. (Other structural materials are further discussed in the Summary section).

Figure 5:
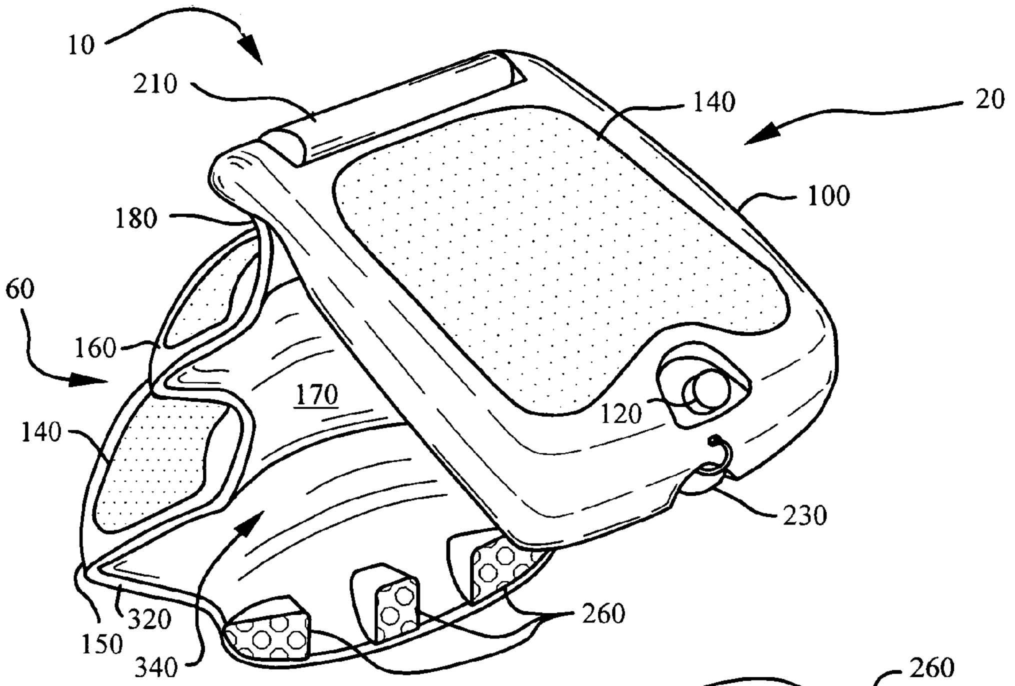
FIG. 5 is a perspective view of the embodiment shown in FIG. 1, but with the apparatus separated from the in-use environment, as seen from an upper left rear position relative to the apparatus.

FIG. 5 shows an apparatus 10 that is a substantially similar embodiment of the invention to the one shown in FIG. 1. In FIG. 5, the apparatus 10 is shown removed from the in-use environment, such as the deck 30 and wall 90 (so, those and other elements of the in-use environment are not shown in FIG. 5). The stair component 60 is shown in FIG. 5 in the deployed position relative to the anchor component 20 (the same relative position as shown in FIGS. 1 and 3 where the apparatus is shown juxtaposed with an in-use environment, which obstructs the view of the stair component 60 from the back). Thus, in FIG. 5, a portion of the back of the stair component 60 can be seen, revealing some features of the back surface of the stair component shell structure 320 (and the rear cavity 340 it defines). For example, FIG. 5 shows some of the rear edge of the stair component shell structure 320, some of the back surface of the step connecting structure 170, and three bumper pads 260 attached to (although, they could alternatively be molded or otherwise formed as part of) the back of the bottom portion of the stair component 60. The rear-facing surfaces of the bumper pads 260 are shown in FIG. 5 as dimpled. (The rear-facing surfaces of bumper pads preferably comprise a material and/or configuration, or combination of materials and configurations, that is effective for damping the impact and/or increasing the resistance to sliding movement, between the stair component 60 and the pool wall 90. Of course, preferably, a configuration is selected that also is not unnecessarily abrasive to the pool wall 90. With due consideration for these sometimes-competing preferences, the materials and configurations discussed above with regard to the friction means and the traction surface may be utilized for the bumper pad 260.) Note also that FIG. 5 shows one of the bumper pads 260 as being centrally located, similar to the bumper pad 260 seen through cross-sectional cut II-II as shown in FIG. 4.)

Figure 6:
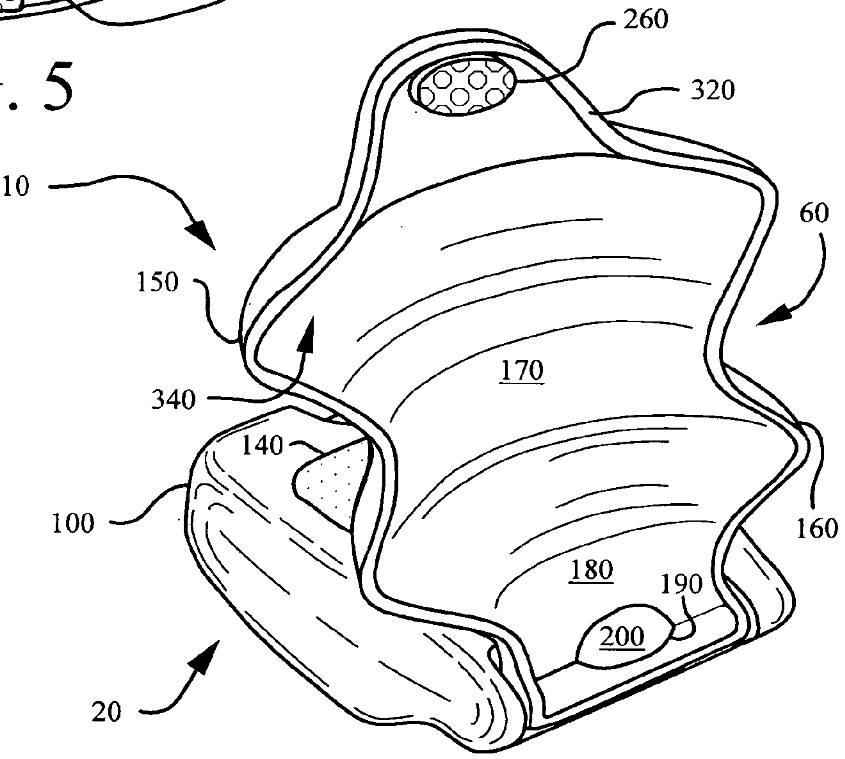
FIG. 6 is a perspective view of the embodiment shown in FIG. 1, with the apparatus separated from the in-use environment, but in a raised configuration (with the stair component in a raised position relative to the at-rest anchor component), as seen from an upper right front position relative to the anchor component of the apparatus.

FIG. 6 shows the stair component 60 in a raised position relative to the anchor component 20, thus also showing portions of the back surface of the stair component shell structure 320 (and the rear cavity 340 it defines). Of course, the bottom of the stair component 60 is seen at the top of FIG. 6, and said bottom is shown with an alternative—longer and narrower—shape as compared, for example, to the shape of the bottom of the stair component 60 shown in FIG. 5. And, FIG. 6 shows the stair component 60 as having only one bumper pad 260. Although it is preferable for the stair component 60 to have at least one bumper pad 260, alternative embodiments of the invention can have stair components 60 with bottom portions of different shapes and with any number of bumper pads 260 that fit within the shapes of those bottom portions, or, although less preferable, locate bumper pads 260 elsewhere on those stair components 60 or, even less preferable, have no bumper pad. FIG. 6 additionally shows the back edge of the stair component shell structure 320. And FIG. 6 shows at least part of the back surface of the step connecting structure 170, the back surface of the upper structure 180 (although it is seen toward the bottom in this figure), the back surface of the concave grip opening 200 (although it is seen as convex when viewed from the back as it is in this figure), and the back surface of the grip handle 190 (shown intersecting with the back surface of the grip opening 200 in this embodiment).

Figure 7:
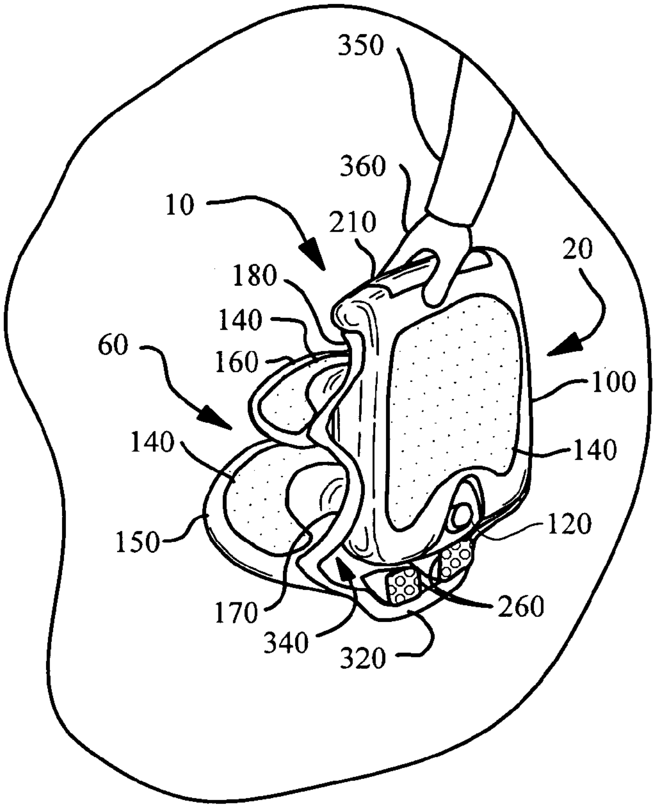
FIG. 7 is a perspective view of an embodiment in a folded configuration (with the stair and anchor components in a folded position relative to one another), being carried by a person, as seen from an upper left rear position relative to the stair component of the apparatus.
Figure 8:
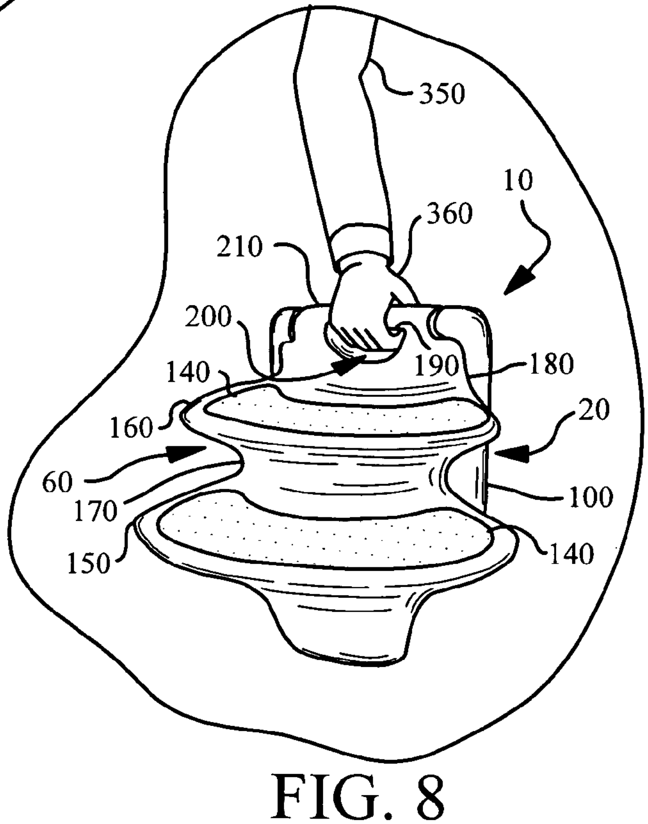
FIG. 8 is a perspective view of an embodiment in a folded configuration, being carried by a person, as seen from an upper (but only slightly raised) left front position relative to the stair component of the apparatus.

FIGS. 7 and 8 show embodiments of the apparatus 10, separated from the in-use environment, with the stair component 60 in the folded position relative to the anchor component 20. In both of these figures, the apparatus 10 is being carried by a person whose shirtsleeve 350 is shown with the person's hand 360 extending therefrom and gripping the carrying handle 190. Obviously, if liquid were in the container 100 prior to picking up the apparatus 10 for carrying, the liquid (at least as much as reasonably possible) would have been drained from the container 100 before the apparatus 10 was picked up. Referring briefly to FIG. 2, which is also discussed above, an embodiment of the container 100 is shown being drained simply by removing the drain-stem cap 230 from the drain stem 220 and allowing the liquid to flow out onto the pool deck 30 (shown collecting in a puddle 240). FIG. 7 shows an embodiment of the invention in which the stair component 60 is made with the stair component shell structure 320 appropriately sized for the rear cavity 340 to receive at least part of the anchor component when the stair component 60 and/or anchor component 20 are rotated into the folded position relative to one another. FIG. 7 also shows an embodiment that uses two bumper pads 260, rather than the one or three bumper pads 260 shown in previous figures. Alternatively, an embodiment of the invention, such as the one shown in FIG. 8, can have a stair component shell structure 320 sized and shaped for the anchor component 20 to remain substantially completely outside the rear cavity 340 while the stair component 60 and anchor component 20 are in the folded position with respect to one another.

Figure 9:
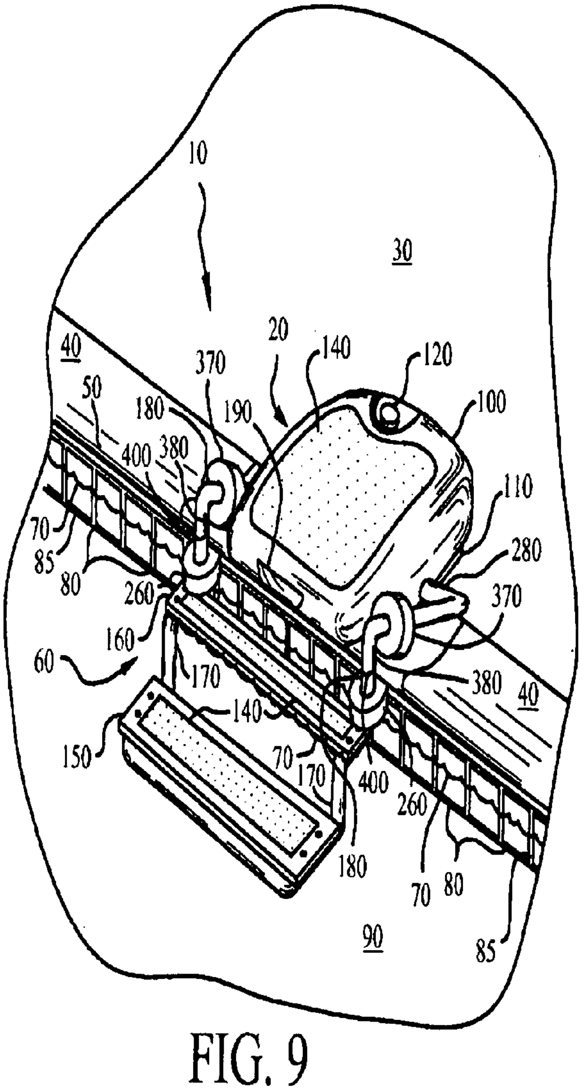
FIG. 9 is a perspective view of an embodiment made in part using alternative materials, deployed in an in-use environment at the edge of a swimming pool deck (with the stair component in a lowered position relative to the at-rest anchor component), as seen from an upper left front position relative to the apparatus.
Figure 10:
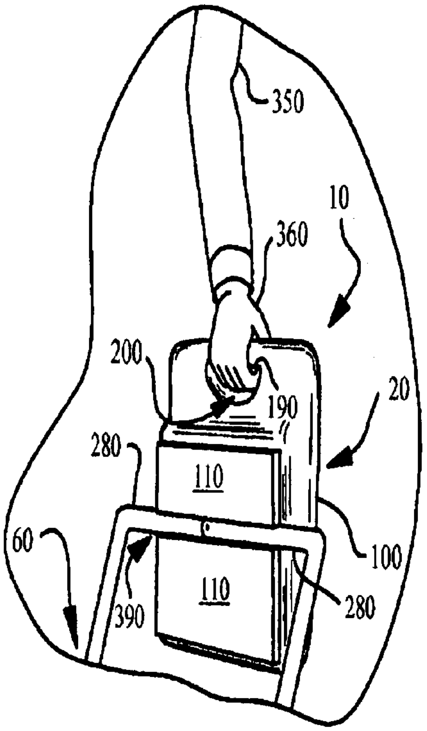
FIG. 10 is a partial perspective view of the embodiment shown in FIG. 9, in a folded configuration, as seen from the bottom side of the anchor component as it is being carried by a person.

FIGS. 9 and 10 show an embodiment of the invention with an anchor component 20 similar to the ones shown in the figures discussed above, except the hinge rod 280, as seen by viewing both of these figures, is two parts of the same tubing material used for the stair component 60, and is inserted into the anchor component 20 within a groove 390 in the bottom of the anchor component 20 (in this embodiment, the groove 390 also cuts through the friction means 110, which is shown in FIG. 10 as separated into two parts). (Thus, as shown in FIG. 9, the anchor component 20 comprises a carrying handle 190, since in this embodiment, the stair component has no nose portion 210 for accommodating the handle 190. This arrangement for the hinge rod 280 allows for easy separation of the stair component 60 when the anchor component 20 is lifted (generally after draining the container 100), but still provides for rotation of the stair component 60 between a lowered position and a raised position while the anchor component 20 is deployed and resting on the deck 30 with its container 100 filled with fluid. Alternatively, the stair component 60 can remain hinged to the anchor component 20 when the apparatus 10 is being carried, by simply not removing the hinge rod 280 from the groove 390, as shown in FIG. 10. If the groove 390 does not adequately retain the hinge rod 280 during carrying, conventional retaining means (not shown), such as a tab or strap, can be provided to span the open side of the groove 390 and attach to, for example, each of the two parts of the friction means 110 by any conventional, preferably removable, means, such as hooks-and-loops and/or clips.

The tubing material used to construct the stair component 60 in the embodiment shown in FIGS. 9 and 10, as best seen in FIG. 9, can be made of any tubing construction material having the strength and rigidity needed to support the anticipated forces from an escaping animal (of size and strength intended for using the particular apparatus), and to resist the corrosive and other deteriorating effects of the in-use environment. Examples of such materials can be found in items typically used in and around swimming pools, such as the metal tubing materials used for pool ladders and the plastic and/or metal tubing materials used for pool cleaning equipment and/or piping. In the embodiment shown in FIG. 9, as in the embodiments discussed above in connection with the other figures, the stair component 60 comprises a lower step 150 and an upper step 160, each shown as having a rectangular shape and supported by the structural material used in this embodiment. The lower step 150 and upper step 160 can be fastened to the tubing material by conventional means such as bolts, screws, straps, or adhesives (but it is preferable for the steps to be removable at least by use of standard tools). Also, as in the previously discussed embodiments, the stair component 60 has a step connecting structure 170 and a stair component upper structure 180 (although the construction materials and shapes may be different). In the embodiment shown in FIG. 9, the upper structure 180 comprises a bumper pad 260 on each side. (Although, alternatively, the vertical portion of the upper structure 180 could be provided with a downward extension, not shown, which extension could also be secured by an extension from the bottom of the step connecting structure 170, for placement of the bumper pads 280 at a lower location.) The annular cylindrical shape (or any "donut" type shape) is an example and not a limitation on the shape or means of attachment of the bumper pads 280. The upper structure 180 in the embodiment shown in FIG. 9 also has an edge support pad 370 for providing support to the upper structure 180 and minimizing impact and rubbing between the upper structure 180 and the deck 30 proximate to the deck edge 50 (which is part of the coping 40 in this figure, as it is in the other figures discussed above). As already noted in the discussion of the bumper pads 280 in this paragraph, the edge support pads 370 are not limited to the shape shown in FIG. 9. The preferable physical characteristics of the bumper pads 280 and the edge support pads 370 shown in FIG. 9 are similar to those discussed above with respect to the bumper pads 280 shown in the other figures.

The embodiment shown in FIG. 9 also has a set of four vertically spaced-apart holes 380 through the vertical section of each upper structure 180, to provide a vertical adjustment means for adjusting the height of the steps, to assure that the lower step 150 is submerged and the upper step 160 is, preferably, only slightly above the level of the water 70. In this embodiment, although not clear from the drawings alone, the vertical section of each upper structure 180 is divided into two parts with one part (preferably the top) vertically slidable over the other part for alignment of the holes 380 in each part and placement of a pin (not shown in the figures) through them to establish the desired step level. (The division of the vertical section of the upper structure 180 is only suggested in FIG. 9 by showing a line 400 around the periphery of and approximately half way up the vertical portion of each upper structure 180 tube, to indicate the visible intersection between the overlapping upper and overlapped lower parts.) This, or any other conventional mechanism for adjusting the vertical dimension of the upper structure 180, or of the step connecting structure 170, or both, can be used to set the level of one or more of the steps.

It should be understood, that the present invention includes all conventional adjustments and modifications to the embodiments described or shown herein, including alternate embodiments of the present invention that have conventional differences in size, shape, proportion, orientation, or direction of rotation from those described or shown herein, without departing from the present invention.

Accordingly, the invention claimed is not limited to the embodiments described or shown herein, but encompasses any and all embodiments within the scope of the claims and is limited only by such claims.

What is claimed is:

1. An apparatus for helping an animal escape from a body of water, wherein the apparatus comprises a. an anchor component, wherein the anchor component comprises a fluid container, wherein the fluid container comprises a top wall, a bottom wall, and at least one sidewall to form a closed hollow enclosure for containing water therein, wherein the top wall of the fluid container comprises a traction surface for the animal to walk thereon, and wherein the bottom wall of the fluid container comprises a friction means for increasing the resistance of the anchor component to sliding on a water-adjacent surface, the container comprising a fill opening for receiving fluid into the container and a drain opening for draining at least some of the fluid from the container, wherein the fill opening includes a fill stem and a removable fill stem cap, and the drain opening includes a drain stem and a removable drain stem cap, b. a stair component comprising at least one stair step;

c. at least one hinge for rotatably connecting the stair component to the anchor component, wherein the stair component and the anchor component are rotable into a folded position relative to one another wherein, while the anchor component is at rest on the water-adjacent elevated surface, the stair component is rotatable into positions comprising a lowered position wherein at least some of the stair component is in the water and a raised position wherein at least most of the stair component is out of the water, and wherein the at least one step is below the level of the water while the stair component is in the lowered position;

d. a carrying handle connected to the stair component or to the anchor component.

2. The apparatus of claim 1, wherein the stair component comprises two or more stair steps, and wherein, while the anchor component is at rest on the elevated surface and the stair component is in the lowered position, each of the steps, other than the highest step, has a horizontal depth greater than the horizontal depth of its next higher step.

* * * * *